United States Patent Office 3,461,094
Patented Aug. 12, 1969

3,461,094
PROCESS FOR THE MANUFACTURE OF IMPROVED REINFORCED PIPE AND OTHER ARTICLES
Ludwig Wesch, Heidelberg, Germany, assignor to Mancar-Trust, Vaduz, Lichtenstein, a firm
No Drawing. Filed July 5, 1967, Ser. No. 651,126
Int. Cl. C08k 1/84; C08g 51/10, 53/14
U.S. Cl. 260—41                                10 Claims

ABSTRACT OF THE DISCLOSURE

A process and the products obtained thereby which comprises preparing high tensile strength fiberglass reinforced plastics and resins by incorporating also specially treated fillers therein; the manufacture of pipe, plates, and the like is especially contemplated.

The known processes to produce glass-reinforced pipes, plates and other shaped articles by using rovings, mats, or fabrics, employing either a continuous, or a non-continuous process, are able to yield high mechanical values only when the glass content for reinforcement is, at least, 70%.

However, for the large-scale use of all fiberglass-reinforced artificial fabrics it is of utmost importance that the cost be as low as possible, as well as that the products be of high quality.

Fundamentally, the determinating cost factor for the manufacture of fiberglass synthetic fabrics is the price for the rovings; and only thereafter is the price for the resins necessary for consideration.

It has now been found that it is possible to obtain high-ample, a ratio of ⅛ part of filler and ⅞ part of resin using a much lower content of fiberglass if other fillers previously subjected to a special treatment are used and if, in addition, a special process is employed for manufacture of the pipes, plates, and other articles. It is of special significance that the special treatment required is much cheaper than using the large amounts of reinforcement to obtain the same result.

The resin types which can be used to make these reinforced products include polyester resins, epoxide resins, hydrocarbon resins and polymethacryl resins.

The preferred balance between quality of product and cost has been found to be a combination of:

⅓ part resin
⅓ part fiberglass
⅓ part filler

The ratio of fiberglass and filler can be varied for the products; the advantages of the process hold true for example, a ratio of ⅛ part of filler and ⅞ part of resin (totaling ⅔ part of the combination) is found useful. However, for mechanical reasons, it is convenient to limit the maximum filler content to ⅓.

For high-tensile strengths, it is necessary to apply to the filler, before mixing it with the resin, a vinyl silane coating, which will insure a good combination between the filler and the resin as well as other advantages.

Further, it has been found that not all fillers have the same consistency when combined with silanes. For this reason, fillers are employed in the new process, which are obtained either from natural sources, or synthetically.

The most important raw material for filler is pulverized quartz. However, other minerals with a high $SO_2$ content may be also employed. It is, of course, possible to combine the filler directly with resin by employing vinyl silanester silane esters.

Of most importance are the inorganic fillers. These may consist of such materials as pulverized quartz, minerals with a high $SiO_2$ content, such as precipitated silicious acid, pure, or precipitated silicious acid with a low percentage of calcium silicates, aluminum oxide, aluminum minerals with a silicon content, titanium dioxide, zinc oxide, zirconium dioxide, or substances containing these materials and combinations thereof.

Besides silicous substances, substance with an aluminum basis may be also employed, as well as aluminum oxide or aluminum minerals with a silicon content. Also included are substances, such as titanium dioxide or zirconium dioxide, or substances in combination with the same. All fillers are soaked in a solution of a rapidly evaporating solvent, such as water, or water mixtures, preferably with acetone, toluene, ethyl acetate, ethanol, or other volatile alcohol to which 0.1 to 10 parts of the selected vinyl silanester have been added.

For use with polyester resins, product A172 of Union Carbide from the United States has proved to be a good service and, for the epoxy resins, A1100 from the same company. However, other silane products may also be used, as well as similar products from Wacker Chemie in Munich, Germany. A more complete list of the silanes employed is shown in Table 1.

For every 100 grams of filler, 50 grams of solution are normally used. The filler is preferably mixed with the solvent in an agitator, the solvent being thereafter evaporated.

In some cases it has been found advisable, when an especially good bond is required—particularly in those cases where the particle size of the fillers is lower than 10 microns—to add up to 10% vinyl silanester to the solvent. In addition, it is recommended to add to the solvent also up to 30% of the resin to be employed. The solvent should be selected in accord with the type of resin involved.

A particularly good effect may be obtained from substances containing hydroxyl groups if, additionally, isocyanates are added to the solvent or resins. It has been ascertained that the preparation Desmodur TT (dimerized 2,4-toluylendiisocyannate) or Desmodur R (20% solution of triphenylmethanetriisocyanate), or similar isocyanate preparation from Bayer-Werke, Leverkusen, Germany, are adequate for the above purpose. The pre-prepared fillers, in the manner mentioned above, are mixed with the resin and then processed by the usual methods

TABLE I.—CHEMICAL COMPOSITIONS OF THE MONOMERS OF SILANE

| Product name | Nomenclature | Formula |
|---|---|---|
| A-151 | Vinyl-triethoxy-silane | $CH_2=CHSi(OC_2H_5)_3$ |
| A-153 | Phenyl-triethoxy-silane | $C_6H_5Si(OC_2H_5)_3$ |
| A-172 | Vinyl-tris-(beta-methoxy-ethoxy)silane | $CH_2=CHSi(OCH_2CH_2OCH_3)_3CH_3O$ |
| A-174 | Gamma-methacryl-oxypropyl-trimethoxy-silane | $CH_2=C-C-O(CH_2)_3Si(OCH_3)_3C-C$ |
| A-186 | Beta-(3,4-epoxy-cyclo-hexyl-ethyl-trimethoxy-silane | (cyclohexyl-epoxide)-$CH_2CH_2Si(OCH_3)_3$ |
| A-187 | Gamma-glycide-oxypropyl-trimethoxy-silane | $CH_2-CH-CH_2-O(CH_2)_3Si(OCH_3)_3$ (epoxide) |
| A-1100 | Gamma-amino-propyl-triethoxy-silane | $NH_2CH_2CH_2CH_2Si(OC_2H_5)_3$ |
| A-1120 | N-beta-(amino-ethyl)-gamma-amino-propyl-trimethoxy-silane | $NH_2CH_2CH_2N(H)(CH_2)_3Si(OMe)_3$ |
| A-1911 | Beta-carbethoxy-ethyl-triethoxy-silane | $C_2H_5OCCH_2CH_2Si(OC_2H_5)_3$ |
| Y-1575 | Beta-cyano-ethyl-triethoxy-silane | $NCCH_2CH_2Si(OC_2H_5)_3$ |
| Y-2525 | Vinyl-trimethoxy-silane | $CH_2=CHSi(OCH_3)_3$ |
| Y-2815 | Amyl-trimethoxy-silane | $C_5H_{11}Si(OC_3)_3$ |
| Y-2967 [1] | Bis(beta-hydroxy-ethyl)-gamma-amino-propyl-triethoxy-silane | $(HOCH_2CH_2)_2N(CH_2)_3Si(OC_2H_5)_3$ |
| Y-4351 | Gamma-chloropropyl-trimethoxy-silane | $ClCH_2CH_2CH_2Si(OCH_3)_3$ |
| Y-4522 | Beta-mercapto-ethyl-trimethoxy-silane | $HSCH_2CH_2Si(OCH_3)_3$ |
| Y-5065 | Bi-cycloheptanyl-triethoxy-silane | (cycloheptyl)-$Si(OC_2H_5)_3$ |
| Y-5107 [2] | Beta-(chloro-methyl-phenyl)-propyl-triethoxy-silane | $ClCH_2C_6H_4-CH(CH_3)-CH_2Si(OC_2H_5)_3$ |
| Y-5271 | Gamma-chloro-iso-butyl-triethoxy-silane | $ClCH_2CH(CH_3)-CH_2Si(OC_2H_5)_3$ |
| Y-5272 | Beta-cyclo-hexyl-ethyl-trimethoxy-silane | (cyclohexyl-S)-$CH_2CH_2Si(OCH_3)_3$ |

[1] These materials represent 62% weight in ethanol.
[2] These materials are a combination of ortho and para-isomers.

For the required tensile strength and proper consistency of the working material to be obtained, the exact matting of the fiberglass with the resin is of utmost importance. In this way the best materials are produced, which, in addition, are submitted to the following processes:

(1) In the production of pipes, the roving strand passes through a soaking tank 1, which contains only a resin mixture, without filler. The roving then passes through a soaking tank which contains the resin mixture and the appropriate pre-treated fillers.

From this step there results a thorough soaking of the roving-strand, which may comprise up to 60 individual threads; at the same time its surface area, while in the second soaking tank is coated with the filler and the resin under reacting conditions.

(2) In the production of plates, or items of any shape from fabrics or mats, firstly, in the soaking tanks, the mats and fabrics are soaked with the pre-prepared resin mixture without filler; then the fabric or mat is soaked in the second tank containing the filler and the resin, where it becomes coated with the filler-resin mixture.

It is also possible to spread the filler mixture between every two tracks of the fabric or mat after the soaking in the first tank.

The reinforcing materials which are advantageously subjected to this process include as well as glass fibers of various kinds available also metal fibers and graphite fibers, either alone or in combinations with other materials.

The further processing of the plates or items of any required shape, thus pre-prepared is carried out according to known methods.

The special advantages of the double-soaking process consists in that a much faster finishing by machine is provided for pipes, profiles, plates and other items, in which, due to the pre-treatment of the filler and the nature of the soaking process, the greatest tensile strength is obtained with a reduced fiberglass content.

While heretofore, to achieve a cheap process, and at the same time obtain good mechanical properties, one had to resort to the cheapest of resin materials, such as the polyester resins, it is now possible, in view of the savings in amount of roving or other more costly glass-thread material, to use also resins which, although not cheap, are of the highest quality. By these other resins is meant especially epoxy resins as well as hydrocarbon and polymethacrylate resins.

With the pre-treatment of the special fillers and the process preferred for use, there is now available a wide fields of products and processes at reasonable expense.

As a further advantage of this process it has been found that the items produced in the winding process, especially pressure items, can support increased pressure, as the pre-treated fillers form firm bonds which close pores of the resins and are mechanically stronger than the solid resin alone.

The trade names of the materials used in the following examples, together with their chemical identity and source, are set forth in Table 2 below:

TABLE 2

Versamid 125—an amino hardener of Scheering, Berlin.
N-aminoatylpiperazin—an amino hardener of Brenntag, Mulheim-Ruhr.

Cardolit 513—an extender of Lehmann & Voss, Hamburg.
Mod-Epox—a softener and an extender of W. Kohnk, Hamburg.
DMP-30—an accelerator of O. Krahn, Hamburg.
Epikote 815 and 828—epoxy resins of Shell-Chemie, Frankfort.
Araldid 553—an epoxy resin of CIBA, Basle.

The invention is described hereinabove in preferred embodiment, but it is to be understood that the invention is in no way confined to the particular forms, uses of amounts shown and described, the same being merely illustrative, and that the invention may be made and carried out in other ways without departure from the spirit of the invention, and therefore there is claimed the right to employ all equivalents coming within the scope of the appended claims and by means of which the advantages and objectives of the invention are obtained and new results and advantages accomplished.

Example 1

Into an initial soaking tank (1) is placed the following:

| | Parts |
|---|---|
| Araldid 533 | 40 |
| Versamid 125 | 60 |
| N-aminoathylpiperazine | 4.5 |

The N-aminoathylpiperazine is added to the Versamid. By means of the hardener product, the viscosity can be controlled and the product also acts as an accelerator.

Obviously, it is possible to use other accelerator systems, resins, as well as other extenders.

Into a second soaking tank (2) is placed the following:

Components A:

| | Parts |
|---|---|
| Araldid 553 | 40 |
| Versamid 125 | 60 |
| N-Aminoathylpiperazine | 7.5 |
| Vinylsilanester A1100 | 1 |

Components B:

| | |
|---|---|
| Quartz flour | 100 |
| Toluene in mixture with [1:1] | 50 |
| Vinylsilanester A1100 | 7.5 |

Components B are mixed well, the solvent agent is evaporated and the remaining material combined with components A of the second soaking tank. The resulting mixture is well stirred and the final viscosity reached is dependent on the chemical assistant agents added as well as on the temperature. Before being formed into pipes and after the roving has already taken up resin, the mixture is checked to ascertain if the preferred mixing ratio of ⅓ resin, ⅓ glass, and ⅓ filler has been reached. Control can either be exercised through off-strippers between Tank 1 and Tank 2, or through use of a higher percentage of components B in components A.

Example 2

In many types of resins it is not possible to store all of the filler in the second soaking tank. For this reason, it has been found desirable to distribute the filler with the resin in several soaking tanks. In such case, it is also possible to work with an increased filler content, for instance a maximum of 20% of the total filler quantity in the last tank.

The use of several soaking tanks is also of advantage because the roving strands, especially when they have more than 10 threads, need a soaking time of, at least, one minute, and, in the case of fast-working machines, the required soaking time can be more readily obtained if several tanks are used.

Example 3

In this example the mixture of Example 1 is repeated and the second tank is employed for the matting of the mats to manufacture plates and hollow items. By increasing the amount of the reactive thinner and raising the corresponding temperature, it is possible to control the viscosity in such a way that the mats are thoroughly soaked and the product can be processed either hard-cold or warm-pressed.

To illustrate this example in simplest form the vinylsilane ester is directly added into the low viscose resin-Versamid mixture, and the quartz flour is used without any previous preparation. In general, the mechanical consistencies remain lower that when a process of double-soaking is employed.

The method herein described can be supplemented by other examples, in which the types of resins preferably used, mentioned above, are employed. Thus, there are many possible combinations and the specialist, on the basis of the method described and the disclosure included herein can use the ones that are most useful.

The technical advantage of the process lies both in its simplicity and, also because it takes advantage of the known facts from the commercial as well as the technical field of the ingredients.

What is claimed is:

1. A process for manufacture of high tensile strength fiberglass-reinforced, filler, resin compositions especially adapted for use in fabrication of reinforced pipe, and with reduced glass content from the amount normally employed, which comprises soaking the fiberglass fiber rovings in the said synthetic resin, and thereafter admixing the previously prepared resin soaked glass fibers with resin soaked filler material, thus combining approximately equal parts of resin, glass reinforcing material, and filler in the final reinforced resin composition.

2. A process according to claim 1 wherein the quantity of glass reinforcing material ranges between 0.33 and 0.60 parts, and the filler content is selected on the basis of the quantity of glass reinforcing material such that the two components total ⅔ of the final resin product.

3. A process according to claim 1, wherein the quantity of resin is increased and that of the filler is reduced the quantity of filler being not less than 10 parts.

4. A process according to claim 1 wherein the filler i an aluminium, titanium, or zirconium silicate or oxide o mixture thereof, having a silane applied to the surface thereof by means of a solvent mixture.

5. A process according to claim 4 wherein organi isocyanates are added to said solvent mixture employe for applying said silane to the surface of said filler.

6. A process according to claim 4 wherein the silan treated filler is added to the resin used in the syntheti fiberglass fabric manufacture in a second soaking process 7. A process according to claim 4 marked in that sev eral soaking processes are employed sequentially.

8. A process according to claim 1 in which the resi employed is an epoxy resin.

9. A process according to claim 1 in which the resi employed is a hydrocarbon resin.

10. A process according to claim 1 in which the resi employed is a polmethacrylate resin.

References Cited

UNITED STATES PATENTS

| | | | |
|---|---|---|---|
| 3,305,514 | 2/1967 | Tiffan. | |
| 2,742,378 | 4/1956 | Grotenhuis | 106—30 |

FOREIGN PATENTS

| | | |
|---|---|---|
| 791,663 | 3/1958 | Great Britain. |

(Other references on following page)

OTHER REFERENCES

"Silane Coupling Agents as 'Integral Blends' in Resin-Fillet Systems," Stermar, Marsden, Society of Plasters Industry (1963), pp. 1–10.

Union Carbide, "Silanes," pp. 14–15 (1959).

ALLEN LIEBERMAN, Primary Examiner
R. BARON, Assistant Examiner

U.S. Cl. X.R.

260—37; 106—300, 308; 240—40

UNITED STATES PATENT OFFICE
CERTIFICATE OF CORRECTION

Patent No. 3,461,094                                    August 12, 1969

Ludwig Wesch

It is certified that error appears in the above identified patent and that said Letters Patent are hereby corrected as shown below:

Column 1, line 37, beginning with "It has now" cancel all to and including "It is of" in line 42, same column 1, and insert the following:

It has now been found that it is possible to obtain high-tensile strength in fiberglass-reinforced synthetic fabrics using a much lower content of fiberglass if other fillers previously subjected to a special treatment are used and if, in addition, a special process is employed for manufacture of the pipes, plates, and other articles. It is of special Signed and sealed this 24th day of November 1970.

(SEAL)
Attest:

EDWARD M. FLETCHER, JR.                      WILLIAM E. SCHUYLER, JR.
Attesting Officer                                Commissioner of Patents